United States Patent [19]

Gorodissky et al.

[11] Patent Number: 4,898,262
[45] Date of Patent: Feb. 6, 1990

[54] DECIVE FOR LUBRICATING HYDRODYNAMIC BEARINGS

[75] Inventors: Boris P. Gorodissky; Jury A. Lotts; Lev N. Veretenov, all of Moscow, U.S.S.R.

[73] Assignee: Moskovskoe Nauchno-Proizvod-stennoe Obiedinenie "Biophizpribor", Moscow, U.S.S.R.

[21] Appl. No.: 241,982
[22] PCT Filed: Nov. 10, 1986
[86] PCT No.: PCT/SU86/00114
§ 371 Date: Jun. 29, 1988
§ 102(e) Date: Jun. 29, 1988
[87] PCT Pub. No.: WO88/03612
PCT Pub. Date: May 19, 1988

[51] Int. Cl.[4] .................. F01M 1/18; F01M 11/10; F16C 1/24
[52] U.S. Cl. .................. 184/6.4; 184/6; 184/108; 384/322; 384/397; 384/400; 137/112; 137/113
[58] Field of Search .................. 184/31, 6, 4, 108, 6; 384/322, 397, 398, 399, 400, 403, 415; 137/112, 113

[56] References Cited

U.S. PATENT DOCUMENTS

| 822,276 | 6/1906 | Hodsdon | 184/6.4 |
| 1,183,153 | 5/1916 | Witry | 184/6.4 |
| 1,470,769 | 10/1923 | Shaw | 184/6 |
| 1,878,207 | 9/1932 | Van Weenen | 184/6 |
| 3,365,711 | 1/1968 | Levesque | 384/398 |
| 3,563,344 | 2/1971 | Veller | 184/6 |
| 3,685,617 | 1/1971 | Gardner | 184/6.28 |
| 4,090,743 | 1/1977 | Suzuki et al. | 308/9 |
| 4,194,796 | 3/1980 | Svensson et al. | 184/6.4 |
| 4,334,596 | 6/1982 | Lounsberry, Jr. | 184/3 A |
| 4,765,357 | 8/1988 | Malik | 137/113 |

FOREIGN PATENT DOCUMENTS

| 1726 | 2/1890 | Fed. Rep. of Germany | 384/398 |
| 87557 | 10/1936 | Sweden | 384/322 |
| 587276 | 1/1978 | U.S.S.R. | |

OTHER PUBLICATIONS

"Smazka Metallorezhuschikh Stankov", V. I. Dikushina, 1956, p. I79.

Primary Examiner—Henry A. Bennet
Assistant Examiner—Denise L. Ferensic
Attorney, Agent, or Firm—Burgess, Ryan and Wayne

[57] ABSTRACT

A device for lubricating hydrodynamic bearings comprising an oil tank (2) and a pump (1) connected to the bearings (8) through a delivery line (5). The delivery line (5) has a value (9) placed below the oil level in the tank (2). The valve has a casing with an inlet port (10) and an outlet port (11) end an auxiliary port (14). A movable member (12) with an axial passage (13) is mounted in the casing to take two positions so that in the first position it shuts-off the auxiliary port (14), the port (10) communicating with the port (11) via the passage (13). end in the second positions, it opens the port (14), the outlet port (11) communicating with the tank (2) through the port (14).

3 Claims, 1 Drawing Sheet

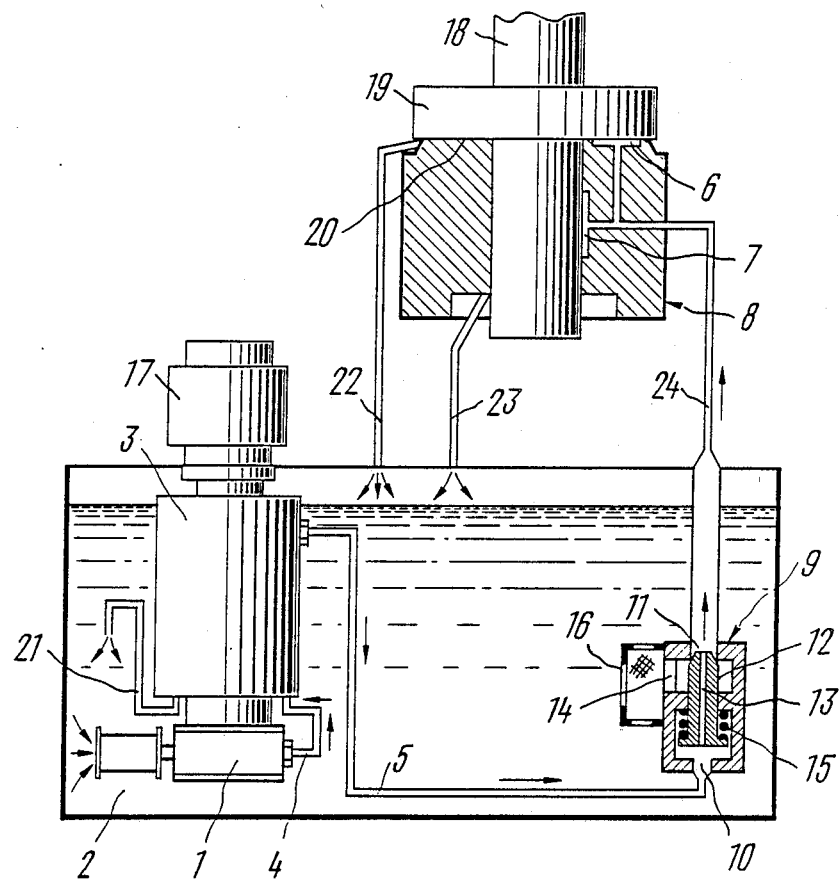

DEVICE FOR LUBRICATING HYDRODYNAMIC BEARINGS

TECHNICAL FIELD

The invention relates to mechanical engineering and, in particular, to a device for lubricating hydrodynamic bearings.

The invention may be most advantageously used in turbines, grinders and other machine tools as well as in various machines having a rotating shaft or spindel journalled in hydrodynamic bearings.

More specifically, the invention may be used in drive units of centrifuges.

BACKGROUND OF THE INVENTION

It is known that hydrodynamic bearings can provide not only good centering of a rotating shaft with respect to the bearing, but they also have a self-lubrication capability.

The most important problem to be solved in designing lubrication systems for hydrodynamic bearings is the problem of ensuring a non-stop lubricant supply to the bearings irrespective of any failures in electric power supply systems and structural members of the lubrication system.

An interruption of lubricant supply to the bearings even for a very short time results in failure of the bearings and in a number of applications even in failure of the equipment incorparating such bearings.

This problem is generally solved by redundancy. However, redundancy brings about a substantial increase in size and weight of the system; in addition, such structural arrangements are sophisticated and unreasonable from a practical viewpoint and the cost of such a system is high. Therefore, there is a long felt need to provide a simple, compact and inexpensive lubrication system which is highly reliable.

Known in the art is a device for lubricating hydrodynamic bearings, comprising an oil tank with a pump which is connected to the bearings via a delivery line (cf. U.S. Pat. No. 4194796, Int. Cl. F 16 C 39/04, Sept. 5, 1978).

The device incorporates a special accumulator with two chambers, one chamber being filled with a gas under pressure supplied from an auxiliary vessel and the other chamber being filled with oil. In case of failure of the pumps there is a danger that metal surfaces of the bearings can contact each other because of an oil pressure drop. The accumulator rules out this failure. This system is, however, complicated in structure because, apart from the conventional use of two pumps as redundancy, it also requires auxiliary pipelines, a number of valves and a compressed gas source.

As a result, size and cost of the device are substantially higher.

Also known in the art is a device for lubricating hydrodynamic bearings in which an attempt was made to reduce auxiliary and redundant equipment (cf. U.S. Pat. No. 3563344, Int. Cl. F 16 N 7/40, Nov. 19, 1968). This device, which comprises an oil tank with pumps connected to the bearings via a delivery line, incorporates a distribution means which is adapted to supply oil to the bearing during normal operation of the pump and upon its failure. This device also calls for a number of auxiliary elements such as a redundant pump, an auxiliary tank and an auxiliary valve. Moreover, this device can only be used for lubrication of hydrodynamic bearings of special design having an auxiliary passage. This makes the device very complex and results in increased cost thereof.

SUMMARY OF THE INVENTION

The invention is based on a solution for the problem of providing a device for lubricating hydrodynamic bearings in which a distribution means which is simple in structure is capable of providing a continuous oil supply to the bearings with the pump both in and out of operation.

The invention resides in a device for lubricating hydrodynamic bearings, comprising an oil tank and a pump connected to the bearings via a delivery line and a distribution means which is adapted to supply oil to the bearings during normal operation of the pump and upon its disconnection. According to the invention, the distribution means comprises a valve placed below the oil level in the tank. The valve has a casing with inlet and outlet ports and a movable member having an axial passage establishing communication between the inlet and outlet ports of the casing. The casing has at least one auxiliary port communicating with the oil in the tank through this port. The movable member is movable to take two positions. In the first position, when the pump is operating, the movable member shuts-off the auxiliary port and the outlet port of the casing is in communication with the inlet port through the axial passage of the movable member. In the second position, when the pump is out of operation, the movable member opens the auxiliary port, and the outlet port communicates with the oil in the tank through the auxiliary port.

This structural solution ensures continuous oil supply to the bearings both in case of a failure in the electric power supply or in case of any mechanical trouble in the pump without the need for any redundant or auxiliary devices thus greatly simplifying the device and minimizing its cost.

Upon trouble with the pump, the device automatically changes over from the hydrostatic to hydrodynamic mode so that the desired oil pressure is maintained.

The movable member is preferably biased by a spring with respect to the casing in the direction towards its second position, and the axial passage is throttled.

This structural arrangement makes it possible to optimize conditions for providing a desired pressure level and to ensure oil supply to the bearings with the pump in operation through the axial passage of the movable member only.

The valve is preferably placed inside the tank so that the auxiliary port thereof is submerged in the oil. The valve is preferably provided with a filter.

This structural arrangement rules out air penetration into the pipelines in case of a loss of tightness in joints, improving reliability of the device and reducing its size.

Therefore, the device, according to the invention, ensures lubrication of hydrodynamic bearings of any type and gurantees maintenance of the desired oil pressure level owing to the automatic switch-over from hydrostatic to hydrodynamic mode. It should be noted that there is no need to use any redundant or auxiliary members.

BRIEF DESCRIPTION OF THE DRAWING

The invention will now be described in detail with reference to the accompanying drawing showing a general view of a device for lubricating hydrodynamic bearings according to the invention.

BEST MODE FOR CARRYING OUT THE INVENTION

A device for lubricating hydrodynamic bearings comprising a pump 1 which is vertically mounted in this embodiment and which is disposed inside an oil tank 2.

The pump 1 may be of any type and functions as any known pumping device with a capacity which is sufficient to maintain a desired oil pressure.

The pump 1 has a filtering element 3 which in this embodiment is mounted coaxially with the pump 1. The pump is connected to the filtering element 3 by means of a pipeline 4. Oil from the tank 2 is supplied through a delivery line 5 to wedge-shaped grooves 6,7 of a hydrodynamic bearing 8. According to the invention, oil supply to the bearing 8 is effected by a distribution means comprising a valve 9 having a casing with an inlet port 10 and an outlet port 11 and a movable member 12 having an axial passage 13 establishing communication between the ports 10 and 11. The valve 9 has at least one auxiliary port 14.

The movable member 12 is movable between two positions. In the first position, during operation of the pump, the movable member shuts-off the port 14 and the outlet port 11 communicates with the inlet port 10 through the axial passage 13. In the second position, when the pump is out of operation, the port 11 communicates with the tank 2 through the auxiliary port 14. The movable member 12 is biased by a spring 15 with respect to the valve 9 in the direction toward the second position. In this embodiment, the axial passage 13 is throttled.

In this embodiment, the valve 9 is placed inside the tank 2 so that the auxiliary port 14 is submerged in the oil available in the tank 2. The auxiliary port 14 has a filter 16.

The pump 1 can be driven by any appropriate known electric motor 17.

A shaft 18 having a thrust journal 19 bears against a thrust face 20 of the bearing 8. A drain line 21 connected upstream from the filtering element 3 enables control of the amount of oil supplied to the bearing 8.

Pipelines 22, 23 are designed for bringing the oil back to the tank 2.

The device functions in the following manner. When the electric power supply is switched on, the electric motor 17 starts operating to drive the pump 1. The pump supplies oil along the line 4 to the filtering element 3. The oil is then fed through the delivery line 5 to the valve 9, through the inlet port 10 thereof, to build-up pressure under the movable member 12. This pressure will compress the spring 15, and the movable member 12 is caused to move towards the outlet port 12 to shut it off.

The oil will flow through the axial passage 13 into the delivery line 24 and further into the wedge-shaped grooves 6, 7 of the bearing 8 so as to ensure its lubrication. Oil returns back to the tank 2 and is effected through the pipelines 22, 23. When the shaft 18 starts rotating, the wedge-shaped grooves 6, 7 of the bearing 8 provide for a hydrodynamic action. Depending on the chosen lubrication conditions, the system will automatically change over from hydrostatic to hydrodynamic mode, or vice versa. The pump 1 is disconnected to change over to the hydrodynamic mode. As a result, oil pressure in the system will decrease to a level which is not sufficient to compress the spring 15 and to hold the movable member 12 in the first position thereof. As a result, the movable member 12 is moved to the second position in which the outlet port 11 is connected to the tank 2 via the auxiliary port 14. Oil will be sucked into the bearing 8 from the tank 2 through the auxiliary port 14. In this embodiment, the port 14 is surrounded by a filter 16 through which the oil gets into the auxiliary port 14.

As mentioned above, the pump 1 works continuously in the hydrostatic mode to pump the necessary amount of oil through the bearing 8, the oil being then drained back to the tank 2 through the pipelines 22, 23. Upon failure in the power supply circuits of the pump 1 or a drive of the shaft 18 (not shown), as well as in case of any other troubles in structural members of the device, e.g., upon a failure of the pump 1, oil pressure will not be enough to hold the movable member 12 in the first position, and the movable member will move under gravity into its second position. As a result, the auxiliary port 14 will be opened, and oil will flow from the tank 2 into the outlet port 11 and further along the delivery line 24 into the grooves 6, 7 of the bearing 8 as described above. Therefore, in case of any of the abovementioned troubles, the system is capable of maintaining oil pressure at a level which rules out any contact between metal surfaces of the bearing thus making any damage to the bearing highly unlikely.

The lubrication system, according to the invention, makes it possible to solve the problem of maintaining the desired oil pressure level in the most inexpensive manner which does not call for the employment of any redundant equipment or auxiliary structural members. The use of the invention makes it possible to solve the problem of providing a simple and inexpensive device for lubricating hydrodynamic bearings in which oil supply and pressure level are maintained in accordance with preset specifications without using any redundant equipment in case of troubles in the electric power supply circuits or mechanical damage to the pump.

INDUSTRIAL APPLICABILITY

The invention ensures lubrication of hydrodynamic bearings and makes it possible to maintain the desired oil level under any conditions of operation of the bearings. Carrying out the invention does not call for any redundant equipment to make up for any troubles in the electric power supply circuits or mechanical damages to the pump. The invention may be widely used in various fields of mechanical engineering, in particular, in turbines, grinders and other machine tools as well as in drive units of various centrifuges and in other types of equipment.

What is claimed is:

1. A device for lubricating hydrodynamic bearings, comprising a pump (1) for pumping oil from a tank (2) through a conduit (5) in communication with a delivery means which supplies oil, with an operating or non-operating pump (1) to hydrodynamic bearings (8) on which a rotating shaft (18) is mounted, wherein the delivery means comprises a valve (9) having an inlet port (10), an outlet port (11), at least one auxiliary port (14) and a movable member (12) with an axial passage (13), through which the inlet port (10) is placed in communication with the outlet port (11) when the pump (1) is in operation, the valve (9) being mounted in the tank (2), so that at least the auxiliary port (14) is submerged in the oil, the movable member (12) with the pump (1) in operation is displaced to a first position, wherein the outlet port (11) is in communication with the inlet port (10) through the axial passage (13) through which oil is pumped into bearings (8) with the shaft (18) in rotation; and wherein the pump (1) is not in operation, the movable member (12) is shifted to a second position, wherein the outlet port (11) suction means at the bearings causes oil to be in communication with the auxiliary port (14) through which oil is sucked into the bearings (8) with the shaft (18) rotating.

2. A device for lubricating hydrodynamic bearings according to claim 1, characterized in that the movable member (12) is biased by a spring with respect to the casing in the direction toward the second position.

3. A device of claim 1, wherein the oil suction means comprises the bearings (8) having wedge-shaped grooves which provide an area with pressure below the pressure of the oil in the tank when the shaft is rotating.

* * * * *